United States Patent [19]
Taniguchi et al.

[11] Patent Number: 6,083,638
[45] Date of Patent: Jul. 4, 2000

[54] FUEL CELL

[75] Inventors: Shunsuke Taniguchi; Akira Hamada; Yasuo Miyake; Minuro Kaneko, all of Osaka, Japan

[73] Assignee: Sanyo Electric Co., Ltd., Osaka, Japan

[21] Appl. No.: 09/058,703

[22] Filed: Apr. 10, 1998

[30] Foreign Application Priority Data

Apr. 11, 1997  [JP]  Japan ..................................... 9-094180

[51] Int. Cl.$^7$ ............................ H01M 2/02; H01M 2/14; H01M 4/86; H01M 4/66; H01M 4/68
[52] U.S. Cl. .............................. 429/34; 429/38; 429/39; 429/41; 429/233; 429/245
[58] Field of Search ................................. 429/34, 41, 38, 429/39, 245, 233

[56] References Cited

U.S. PATENT DOCUMENTS

| | | | |
|---|---|---|---|
| 4,038,463 | 7/1977 | Lamarine et al. | 429/44 |
| 4,215,183 | 7/1980 | MacLeod | 429/30 |
| 4,931,168 | 6/1990 | Watanabe et al. | 204/284 |
| 5,350,643 | 9/1994 | Imahashi et al. | 429/33 |
| 5,510,202 | 4/1996 | McCoy et al. | 429/19 |
| 5,523,181 | 6/1996 | Stonehart et al. | 429/192 |
| 5,641,586 | 6/1997 | Wilson | 429/30 |
| 5,865,968 | 2/1999 | Denton et al. | 204/284 |

FOREIGN PATENT DOCUMENTS

| | | |
|---|---|---|
| 389 020 | 10/1989 | Austria . |
| 03182052 | 8/1991 | Japan . |
| 04012462 | 1/1992 | Japan . |
| 06044985 | 2/1994 | Japan . |
| 06084533 | 3/1994 | Japan . |
| 07105957 | 4/1995 | Japan . |
| 97/08766 | 3/1997 | WIPO . |
| WO 97/08766 | 3/1997 | WIPO . |

OTHER PUBLICATIONS

Chemical Abstract vol. 115, No. 24. Dec. 16, 1991. Furuya et al: "Porous electrodes and their uses." XP002072224.
Chemical Abstract vol. 116, No. 22. Jun. 1, 1992. Nishihara: "Solid polymer–electrolyte fuel cells." XP002072225.

*Primary Examiner*—Kathryn Gorgos
*Assistant Examiner*—Edna Wong
*Attorney, Agent, or Firm*—Merchant & Gould P.C.

[57] ABSTRACT

A current collector includes a thin porous substrate and a hydrophilic material, where the hydrophilic material is provided to holes of the thin porous substrate or surfaces of skeleton elements of the porous substrate so that hydrophilic areas formed by the hydrophilic material successively pass through the thin porous substrate between both surfaces of the thin porous substrate. In the current collector, water is let out through the hydrophilic areas and does not stay on an interface between an electrode and the current collector so that reaction gas is not hampered and is supplied, unlike a conventional current collector. When the current collector is applied to a polymer electrolyte fuel cell, water is supplied with reliability through the hydrophilic areas to a polymer electrolyte membrane so that the polymer electrolyte membrane is effectively humidified. The current collector applied to a cathode achieves a profound effect because reaction product water tends to stay around a cathode of any types of fuel cells. The current collector also includes gas flow paths which are surrounded by particles of a hydrophobic material and pass through the thin porous substrate between both surfaces of the thin porous substrate. As a result, gas permeability of the current collector is maintained with reliability.

37 Claims, 12 Drawing Sheets

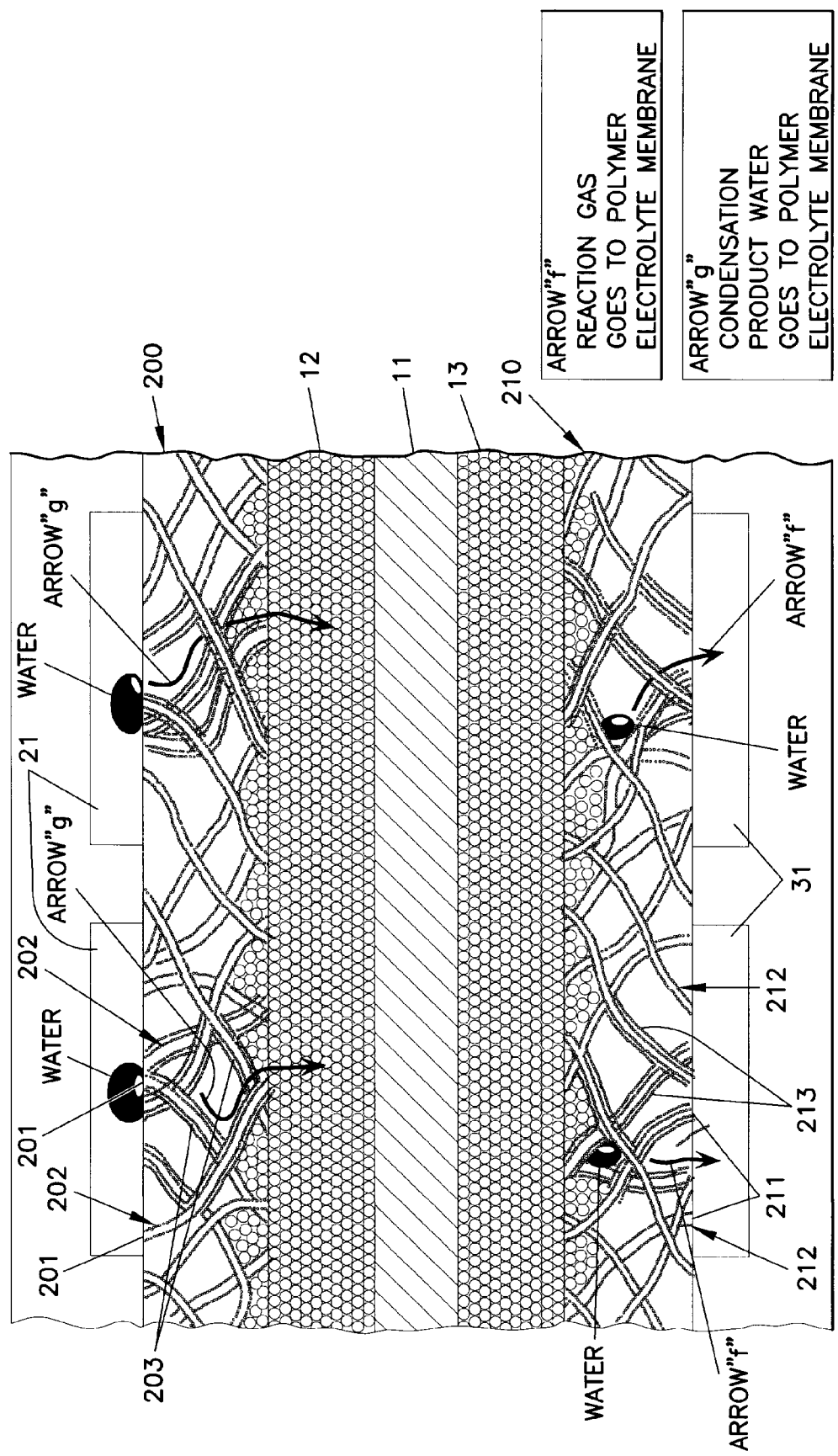

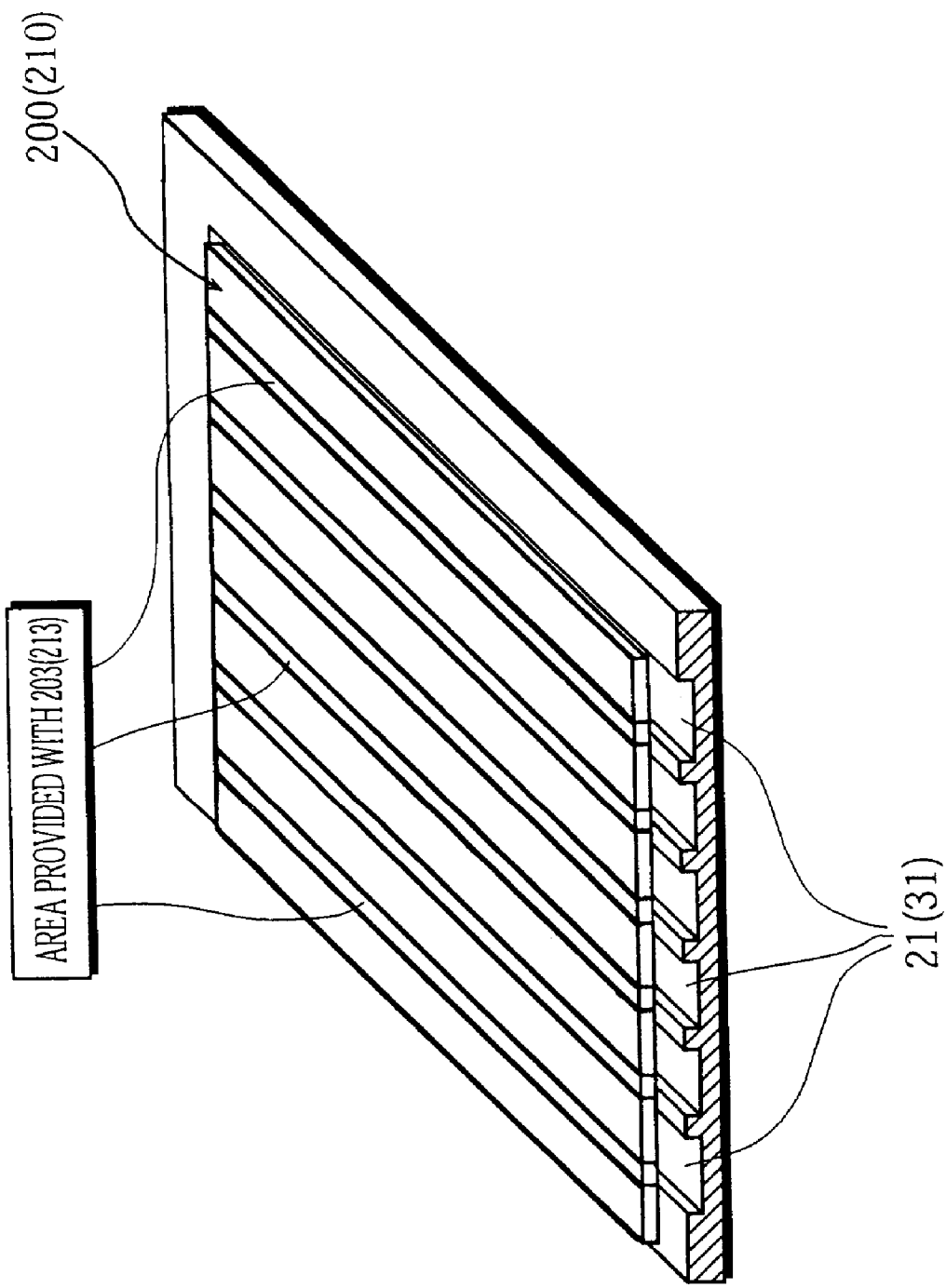

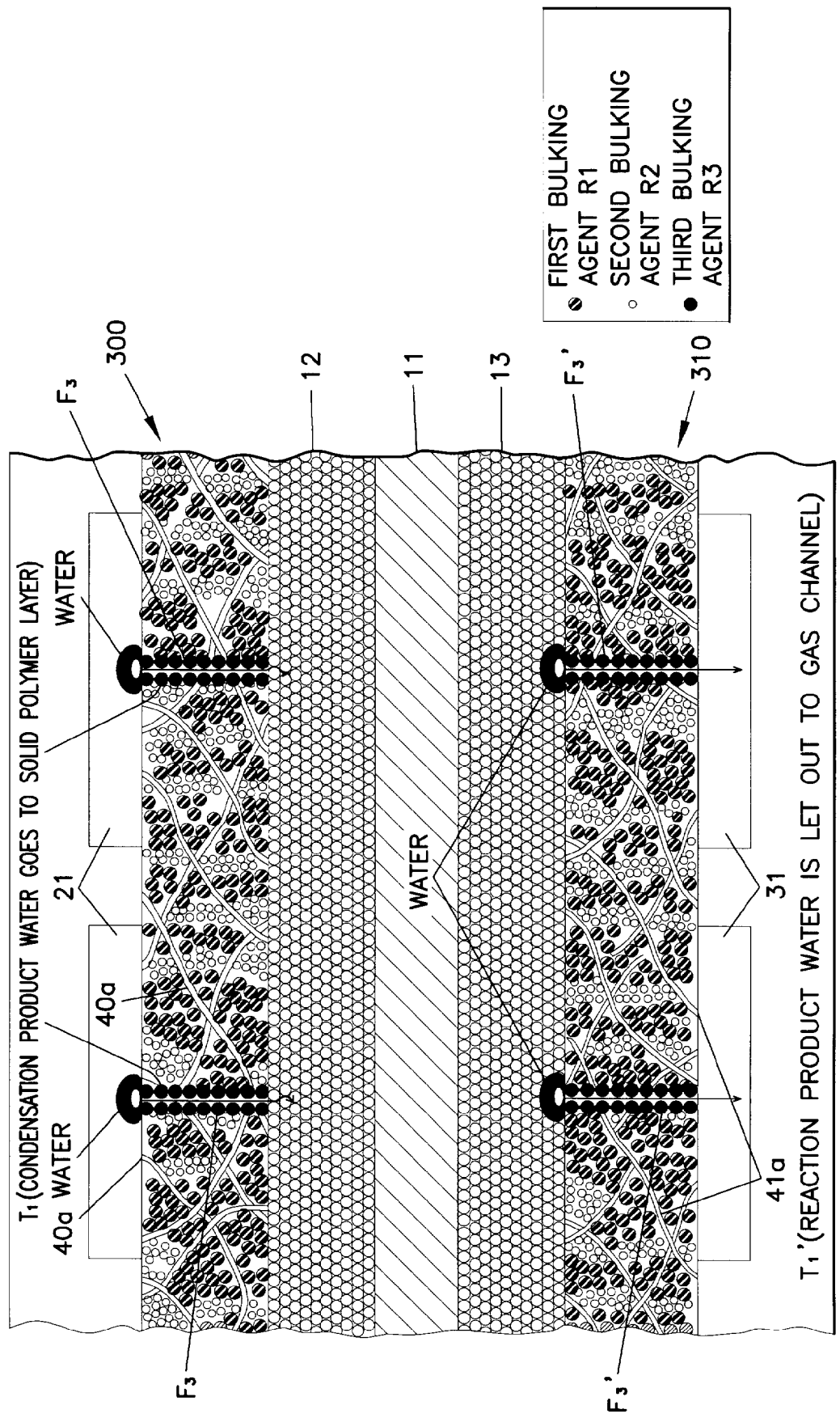

FIG. 10

TABLE 1

COMBINATION OF FIBER OF CURRENT COLLECTOR, FIRST BULKING AGENT R1 AND SECOND BULKING AGENT R2

| FIBER OF CURRENT COLLECTOR | FIRST BULKING AGENT R1 | SECOND BULKING AGENT R2 |
|---|---|---|
| CARBON FIBER (ELECTRIC CONDUCTIVE) METAL FIBER (ELECTRIC CONDUCTIVE) | CARBON POWDER (ELECTRIC CONDUCTIVE) | FLUORORESIN |
| | METAL POWDER (ELECTRIC CONDUCTIVE) | FLUORORESIN |
| | GLASS POWDER (NON-ELECTRIC CONDUCTIVE) | FLUORORESIN |
| | CERAMIC POWDER (NON-ELECTRIC CONDUCTIVE) | FLUORORESIN |
| | HYGROSCOPIC POWDER SUCH AS SILICA GEL AND ZEOLITE (NON-ELECTRIC CONDUCTIVE) | FLUORORESIN |
| | FLUORORESIN | FLUORORESIN |
| | NYLON, RAYON, POLYESTER, ACRYLIC FIBER | FLUORORESIN |
| | RESIN OTHER THAN FLUORORESIN SUCH AS POLYCHLAL RESIN AND VINYLIDENE RESIN | FLUORORESIN |
| GLASS FIBER (NON-ELECTRIC CONDUCTIVE) | CARBON POWDER (ELECTRIC CONDUCTIVE) | FLUORORESIN |
| GLASS FIBER (NON-ELECTRIC CONDUCTIVE) | METALLIC POWDER (ELECTRIC CONDUCTIVE) | FLUORORESIN |

(TABLE 2)

FUEL CELL

BACKGROUND OF THE INVENTION (1) Field of the Invention

The present invention relates to a fuel cell and in particular to a technique for improving a current collector.

(2) Related Art

Fuel cells directly take out electric power of chemical energy of fuel, such as hydrogen, using reverse reaction of water electrolysis, which is the basic principle of fuel cells.

Fuel cells are divided into several types in terms of methods of realizing this principle. General fuel cells are alkali type, polymer electrolyte type, phosphoric acid type, fused carbonate electrolyte type, and high temperature solid electrolyte type.

The following description concerns a polymer electrolyte fuel cell, one type of the fuel cells. The polymer electrolyte fuel cell has a lamination structure which includes: a cell composed of an anode, a cathode, and a polymer electrolyte membrane therebetween; a pair of separator plates with ribs which sandwiches the cell; a pair of current collectors which are each inserted between one of the separator plates and the cell so that the current collectors contact the anode and cathode, respectively; sealing members which are each inserted between the outer regions of one separator plate and the cell. Reaction gases are supplied to the anode and cathode, respectively, to generate electric power using an oxidation reduction reaction expressed by the following formulas, namely Chemical 1 and Chemical 2.

$$H_2 \rightarrow 2H^+ + 2e^- \quad \text{(Chemical 1)}$$

$$2H^+ + 1/2O_2 + 2e^- \rightarrow H_2O \quad \text{(Chemical 2)}$$

This polymer electrolyte fuel cell is characterized by obtaining a high output, with keeping its operation temperature relatively low, compared with other type fuel cells.

The current collectors are basically required to have the following two functions other than the current collective property.

The first function is gas permeability. This function is necessary to supply and distribute reaction gases to electrode catalyzer layers which each contact one of the current collectors.

The second function is water repellence. If current collectors have high hygroscopicity, these current collectors absorb moisture of reaction gas, which is supplied after being humidified, and reaction product water during the operation of the polymer electrolyte fuel cell. As a result, the gas permeability is lowered. To prevent such situation, this water repellence property of current collectors is also necessary to realize a high-performance fuel cell.

Porous substrates, such as hydrophobic finishing carbon paper, are usually used as the current collectors to obtain current collectors having the above basic functions (see Japanese Laid-Open Patent Application No. 4-25674).

However, when current collectors of the hydrophobic finishing carbon paper are applied to a fuel cell, reaction product water and condensation product water stay between the current collectors and electrodes while the fuel cell is operating. As a result, the hydrophobic finishing affects adversely and the reaction gas is not sufficiently distributed and supplied. Note that water generated by the reduction reaction is hereinafter referred to as "reaction product water" and water generated by the condensation as "condensation product water".

In particular, when the current collectors are applied to a polymer electrolyte fuel cell, water is not sufficiently supplied to a polymer electrolyte membrane so that the polymer electrolyte membrane is dried.

The object of the present invention is to provide a current collector which solves the above problems, and to provide a fuel cell and a cell structure element including this current collector.

SUMMARY OF THE INVENTION

To achieve the above objects, the fuel cell of the present invention is applied with a current collector having a new structure. As a result, cell characteristics, such as cell voltage, does not decrease over time.

This current collector having a new structure includes a thin porous substrate and a hydrophilic material, where the hydrophilic material is provided to holes of the thin porous substrate or surfaces of skeleton elements of the porous substrate so that hydrophilic areas formed by the hydrophilic material successively pass through the thin porous substrate between both surfaces of the thin porous substrate.

Also, the hydrophilic areas which function as water flow paths may be made by loading hydrophilic materials into through openings established in the thin porous substrate between both surfaces of the thin porous substrate.

By doing so, total affinity, namely hydrophilic property, of a current collector increases, compared with conventional one, so that water moves through the current collector.

In other words, because the hydrophilic areas let out water and water does not stay near the interface between an electrode and a current collector, reaction gas is supplied without obstacle. When this current collector having hydrophilic areas is applied to a polymer electrolyte fuel cell, water is supplied through the hydrophilic areas with reliability so that a polymer electrolyte membrane is efficiently humidified.

Because reaction product water tends to stay near a cathode of any types of fuel cells, a current collector of the present invention applied to a cathode achieves a profound effect.

The current collector also includes gas flow paths which pass through the thin porous substrate between both surfaces of the thin porous substrate. The gas channels are made by providing hydrophobic material to holes of the thin porous substrate or surfaces of skeleton fibers of the thin porous substrate. As a result, gas permeability is maintained with reliability.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 6a and 6b is a sectional view of a current collector of Embodiment 2;

FIG. 7 is a sectional view of a current collector of Embodiment 3;

FIG. 10 (Table 1) gives materials that can be used as the first and second bulking agents R1 and R2.

DESCRIPTION OF PREFERRED EMBODIMENTS

The following is a description of a polymer electrolyte fuel cell to which a current collector of the present invention is applied, with reference to the drawings.

Embodiment 1

Entire Structure of Polymer Electrolyte Fuel Cell

Figure 1:
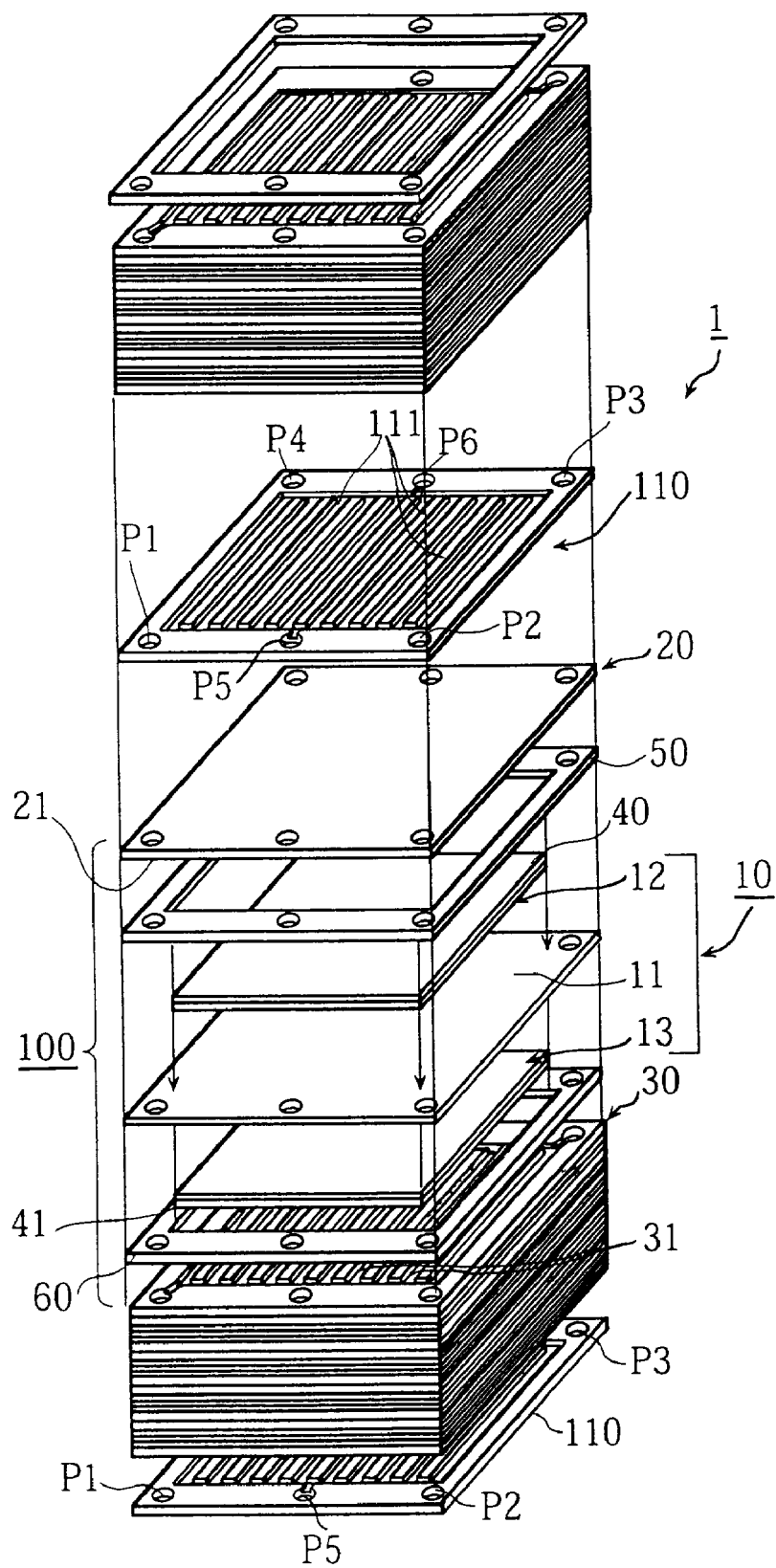
FIG. 1 is an assembly drawing of the main part of a polymer electrolyte fuel cell of Embodiment 1.

FIG. 1 is an assembly drawing of a structure of the main part of the polymer electrolyte fuel cell 1 (hereinafter referred to as the fuel cell 1).

The fuel cell 1 is composed of a plurality of basic units 100 which are laminated, with cooling plates 110 being each inserted between the basic units. The basic units 100 and the cooling plates 110 are sandwiched between two insulated end plates which are not shown in the drawing. Note that the number of basic units 100 is adjusted according to intended voltage output.

This basic unit 100 includes: cell 10 including polymer electrolyte membrane 11 which is an electrolyte layer, anode 12, and cathode 13, where the anode 12 and the cathode 13 are respectively placed on the center of surfaces of the polymer electrolyte membrane 11; a pair of separator plates 20 and 30, where the separator plate 20 is provided with a plurality of anode gas channels 21 (the gas channels 21 cannot be seen in FIG. 1 because they are provided on the lower surface of the separator plate), the separator plate 30 is provided with a plurality of gas channels 31, and the separator plates 20 and 30 sandwiches the cell 10; a pair of current collectors 40 and 41, where the current collector 40 is inserted between the separator plate 20 and the cell 10 and the current collector 41 is inserted between the separator plate 30 and the cell 10 so that the current collectors 40 and 41 contact the separator plates 20 and 30, respectively; and sealing members 50 and 60, where the sealing member 50 is inserted between the separator plate 20 and the cell 10 to seal the outer regions of the separator plate 20 and the cell 10 and the sealing member 60 is inserted between the separator plate 30 and the cell 10 to seal the outer regions of the separator plate 30 and the cell 10.

The plurality of anode gas channels 21 face the anode 12 with the current collector 40 in between, and the plurality of cathode gas channels 31 face the cathode 13 with the current collector 41 in between.

Although the polymer electrolyte membrane 11 may be made of any types of cation exchange resins, a layer of NAFLON® (product of DuPont) is used as the polymer electrolyte membrane 11, for instance.

The current collectors 40 and 41 have porosity and electric conductivity and are made by loading bulking agents into a porous substrate of proper strength. The detailed description of the manufacturing method and internal structure of the fuel cell 1 are given below.

The anode 12 is a thin layer formed on a surface of the current collector 40 and is made of mixture paste of catalyst particles and a binder using a known method such as the screen printing method. The mixture paste is, for instance, a mixture of platinum carbon (Pt/C) and a binder, such as TEFLON® and NAFLON® (products of DuPont). To effectively humidify the polymer electrolyte membrane, it is preferable to use NAFLON® as a binder because NAFLON® has high hydrophilic property. When the anode 12 is formed using the screen printing, it is preferable to use only NAFLON®, because NAFLON® does not tend to harden and easily passes through a mesh of a screen used for the screen printing.

The cathode 13 is a thin layer formed on a surface of the current collector 41 and, as the anode 12, is made of mixture paste of catalyst particles and a binder.

The cell 10 is formed by crimping the current collector 40 having the anode 12, the current collector 41 having the cathode 13, and the polymer electrolyte membrane 11 therebetween using the hot press method under predetermined conditions (temperature is 150° C., 70 kg/cm$^2$, and processing time is 90 seconds, for instance). As described above, in the present embodiment, the cell 10 and the current collectors 40 and 41 are formed in one piece. This one piece element is hereinafter referred to as a cell structure element.

The separators 20 and 30 are dense substrates which are processed using carbon to give the separators high electrical conductivity. The cooling plate 110 is also a substrate having high electrical conductivity.

Corner regions of each of the polymer electrolyte membrane 11, the separators 20 and 30, and the cooling plate 110 are provided with through openings P1 to P4 which form manifolds for supplying and letting out reaction gases. The through openings P5 and P6 are provided in the centers of a pair of opposing edges of each plate to form manifolds for pouring in and letting out a coolant. The through openings P2 and P4 positioned on a diagonal line of the separator plate 20 are connected to the gas channels 21 (not shown in the figure). The through openings P1 and P3 positioned on a diagonal line of the separator plate 30 are connected to the gas channels 31. The through openings P5 and P6 of the cooling plate 110 are connected to the coolant channels 111.

In the fuel cell 1 having the above structure, cathode gas represented by oxygen is supplied through the manifold for supplying cathode gas to each cathode gas channel 31 so that the cathode gas is used to cause an oxidation reduction reaction. Excess cathode gas is let out through the manifold for letting out cathode gas.

On the other hand, anode gas represented by hydrogen which is humidified by a humidification device not shown in the figure is supplied through the manifold for supplying anode gas. The anode gas is distributed to each anode gas channel 21 so that moisture included in the anode gas is used to humidify the polymer electrolyte membrane 11 and the anode gas is also used to cause the oxidation reduction reaction. Excess anode gas is let out through the manifold for letting out anode gas.

This operation is performed successively to generate power.

Note that although each member is laminated vertically in the figure, the laminated members are actually positioned so that gas channels run vertically and reaction product water and condensation product water easily drop from channels due to their weight during the operation.

Description of Each Current Collector (1) Structure

The current collectors 40 and 41 includes: porous substrates made of one of carbon fibers, glass fibers, and resin fibers, or made of mixture of any of these fibers, and mixture of the second bulking agent R2 which is hydrophilic and the first bulking agent R1 which is more hydrophilic than the second bulking agent R2, where the mixture is loaded into the holes of the porous substrates.

Figure 2:
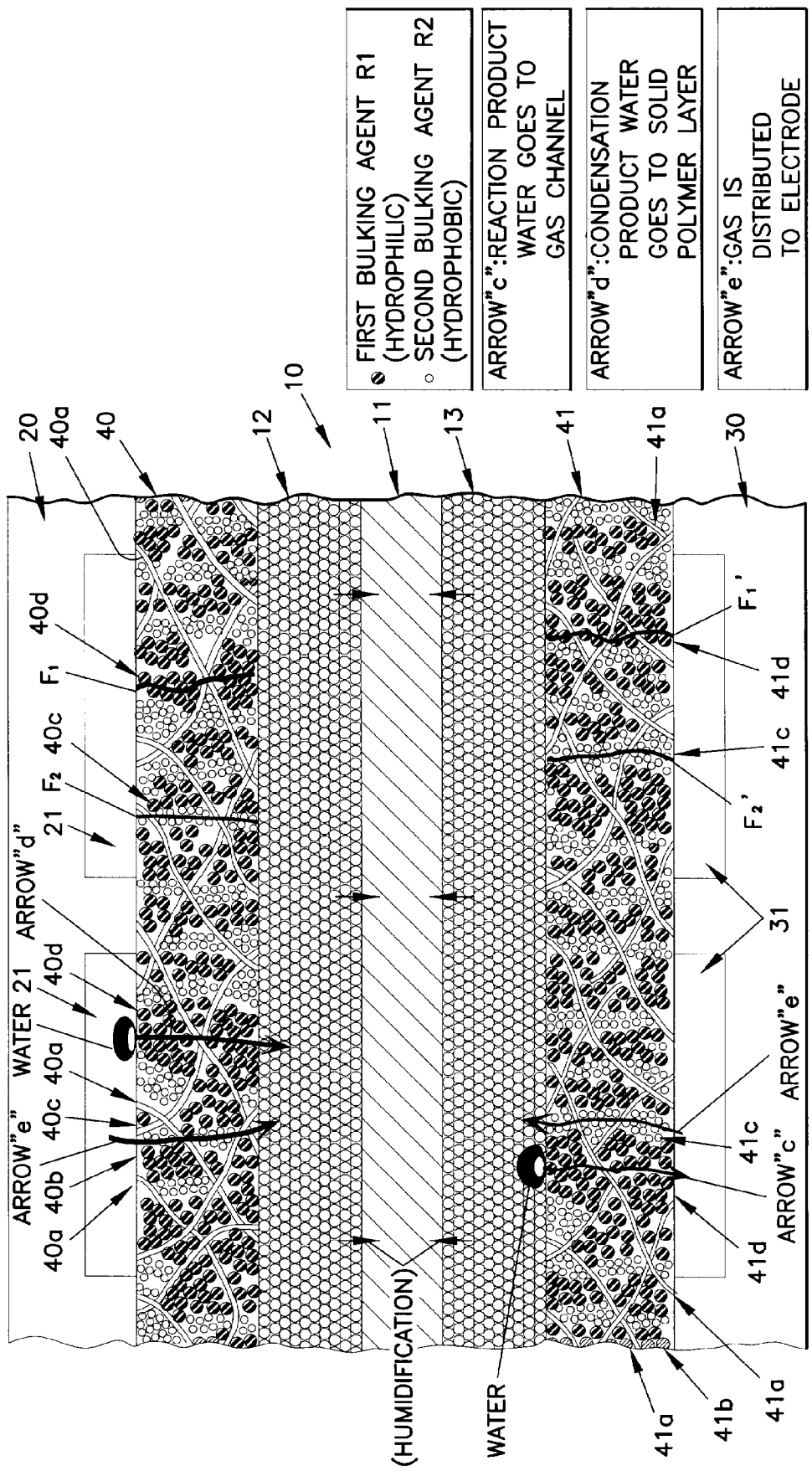
FIG. 2 is a sectional view of a current collector of Embodiment 1.

FIG. 2 is a sectional view of a main part of the fuel cell 1 including the cell and both current collectors 40 and 41 (note that description of how water moves near the current collectors is also provided below to describe the function of the current collectors).

As shown in FIG. 2, the current collector 40 (41) is a synthetic porous substance in which the porous mixture phases 40b (41b) are formed between each fiber 40a (41b) which compose a porous substrate.

The porous mixture phases 40b (41b) are made of the first bulking agent R1 and the second bulking agent R2. In detail, the current collector 40 (41) has a two phase structure including the hydrophilic phases 40c (41c) and the hydrophilic phases 40d (41d). The hydrophobic phases 40c (41c) are the second bulking agent R2, where successive particles of the bulking agent form the phases 40c (41c) and the phases 40c (41c) are properly distributed in a porous substrate. The hydrophilic phases 40d (41d) is the first bulking agent R1, where successive particles of the bulking agent form the phases 40d (41d) and the phases 40d (41d) are properly distributed in the porous substrate.

As described above, the hydrophobic phases 40c (41c) are formed by successive particles of the second bulking agent R2 so that the phases include paths F2 (F2'), the paths F2 (F2') being shown in the figure as solid lines and being formed by gaps of the bulking agent particles.

As described above, the hydrophilic phases 40d (41d) are formed by successive particles of the first bulking agent R1 so that the phases include paths F1 (F1'), the paths F1 (F1') being shown in the figure as solid lines and being formed by gaps of the bulking agent particles.

Note that the structure of the current collector described above is confirmed by observing the section of the current collector using a scanning electron microscope (SEM). The structure is also supported by high wettability between the same materials.

Table 1 (FIG. 10) gives materials which can be used as the first and second bulking agents R1 and R2.

As shown in Table 1, the first bulking agent R1 and the second bulking agent R2 are different in hydrophilic property. Hydrophilic materials may be used as the first bulking agent R1, when hydrophilic chemical species, such as leaving groups including sulfonate groups and carboxyl groups, hydroxy groups, and carbonyl groups are generated on the surface of the materials. Also, materials which generally have low hydrophilic property may be used as the second bulking material R2 which is more hydrophobic than the first bulking agent R1. However, Table 1 (FIG. 10) gives especially high hydrophobic materials used as the second bulking agent R2.

Therefore, for instance, the first bulking agent R1 may be composed of one the following materials or a mixture of any of them: a high water absorptive material such as silica gel and zeolite, carbon black powder (carbon powder) on whose surface hydroxy groups or carboxyl groups exist, crushed powder carbon fibers (carbon powder) on whose surfaces hydroxy groups or carboxyl groups exist, nickel powder on whose surface hydroxy groups or carboxyl groups exist, metal powder such as iron powder, glass powder, powder of perfluorocarbon sulfonic acid polymer having leaving groups such as sulfonate groups (NAFLON®) product of DuPont), powder of resin such as perfluorocarbon carboxylic acid polymer having the leaving groups such as carboxyl groups, powder of fibers represented by nylon, acrylic polyester, and rayon having polar groups, and resin other than fluororesin such as polychlal and vinylidene chloride polymer.

The second bulking agent R2 is a fluororesin which has high hydrophobic property, compared with other resins. For instance, this hydrophobic fluororesin may be composed of one the following materials or a mixture of any of them: polytetrafluoroethylene (TEFLON® made by DuPont, PTFE), tetrafluoroethylene-perfluoroalkylvinylethercopolymer (PFA), tetrafluoroethylene-hexafluoropropylenecopolymer (FEP), polychlorotrifluoroethylene (PCTFE), polyvinylidene fluoride (PVDF), polyvinyl fluoride (PVF), and tetrafluoroetyleneethylene copolymer (ETFE). When a resin is used as the second bulking agent R2, as described above, the resin doubles as a binder for binding the first bulking agent R1 and a porous substrate.

Note that when carbon powder, metal powder, or ceramic powder is used as the first bulking agent R1, it is preferable to oxidize the material beforehand. This is because the oxidation generates hydrophilic groups on the surface of the material.

When the porous substrate is made of a material including electric conductive ingredients such as metal fibers represented by carbon fibers and nickel fibers, the current collector has electric conductivity of the material so that both bulking agents may be non-electric conductive materials. Therefore, it is possible to use a non-electric conductive material such as ceramic powder, glass powder, silica gel powder, zeolite powder as the first bulking agent R1 and to use a non-electric conductive fluororesin as the second agent R2. The carbon fibers may be petroleum pitch carbon fibers, polyacrylonitrile carbon fibers, or cellulose carbon fibers.

When the porous substrate is made of only non-electric conductive material such as glass fibers or resin fibers, the material does not collect current so that one of the bulking agents need to be electric conductive material to give the current collectors electric conductivity. Therefore, it is effective to use an electric conductive material such as carbon powder or metal powder as the first bulking agent R1 and to use a non-electric conductive fluororesin as the second bulking agent R2.

(2) Manufacturing Method

The current collector 40 (41) is produced by: impregnating a porous substrate (carbon paper, for instance) having a predetermined pore volume with a fluororesin or spraying a fluororesin onto the porous substrate; and applying a mixture of the hydrophilic first bulking agent R1, the hydrophobic second bulking agent R2, and volatile solvent to both surfaces of the current collector 40 (41).

The porous substrate is coated with fluororesin beforehand because carbon fibers, glass fibers, or metal fibers forming the substrate has not enough mechanical strength and needs to be reinforced. Note that the porous substrate used in this embodiment is a commercial product formed by rolling fiber materials by a press working. For example, the porous substrate made of glass fibers or metal fibers may be a product of Nihon Seisen Co.

The surface of the substrate to which the mixture is applied is formed evenly using a blade, and the substrate is dried and is baked at high temperature (360° C., for instance) for a predetermined time (for two hours, for instance). The substrate is then formed into a predetermined size.

It is preferable to perform the baking at a temperature higher than melting temperatures of resins of the first and second bulking agents R1 and R2. This is because a part of particles of the bulking agents melts at this temperature so that the particles are connected to each other.

While the particle diameter of the bulking agents depends on the hole diameter of the porous substrate, the particle diameter may be 0.01 μm to 100 μm.

While the amount of the bulking agents loaded into the porous substrate depends on hole diameter of the porous substrate and particle diameters of the first and second bulking agents R1 and R2, the bulking agents are, for instance, loaded in the bulk density ranging from 0.12 g/cm$^3$ to 0.15 g/cm$^3$. Here, the bulk density (g/cm$^3$) is a value obtained by: obtaining a bulking agent amount using difference between the weight of only the substrate and the weight of the substrate to which mixture paste has been applied; and dividing the obtained bulking agent amount (g) by pore volume (cm$^3$) which is measured using a known method.

The substrate to which mixture paste has been applied is dried, is impregnated with solution in which hydrophobic or hydrophilic resin is dispersed or is given a spray of the solution, and is subjected to a heat treatment. Inorganic materials used as bulking agents tend to drop from substrates. However, the above reprocessing prevents such a drop.

It is preferable to apply mixture paste onto both surfaces of a porous substrate, not onto only one surface, to make the paths F1, F1', F2, and F2' pass through the substrate to connect both surfaces of the substrate. It is also preferable to increase the viscosity of the mixture paste as high as possible to form such paths F1, F1', F2, and F2 at high rate.

Note that, when a bulking agent has electric conductivity, mixture paste may be applied again so that the porous substrate has a certain thickness.

(3) Operation and Effect

There are profound functional differences between the current collectors 40 and 41 having the above structure and a conventional hydrophobic finish porous substrate. The following is a description of the differences, with reference to FIGS. 2 and 3.

Figure 3:
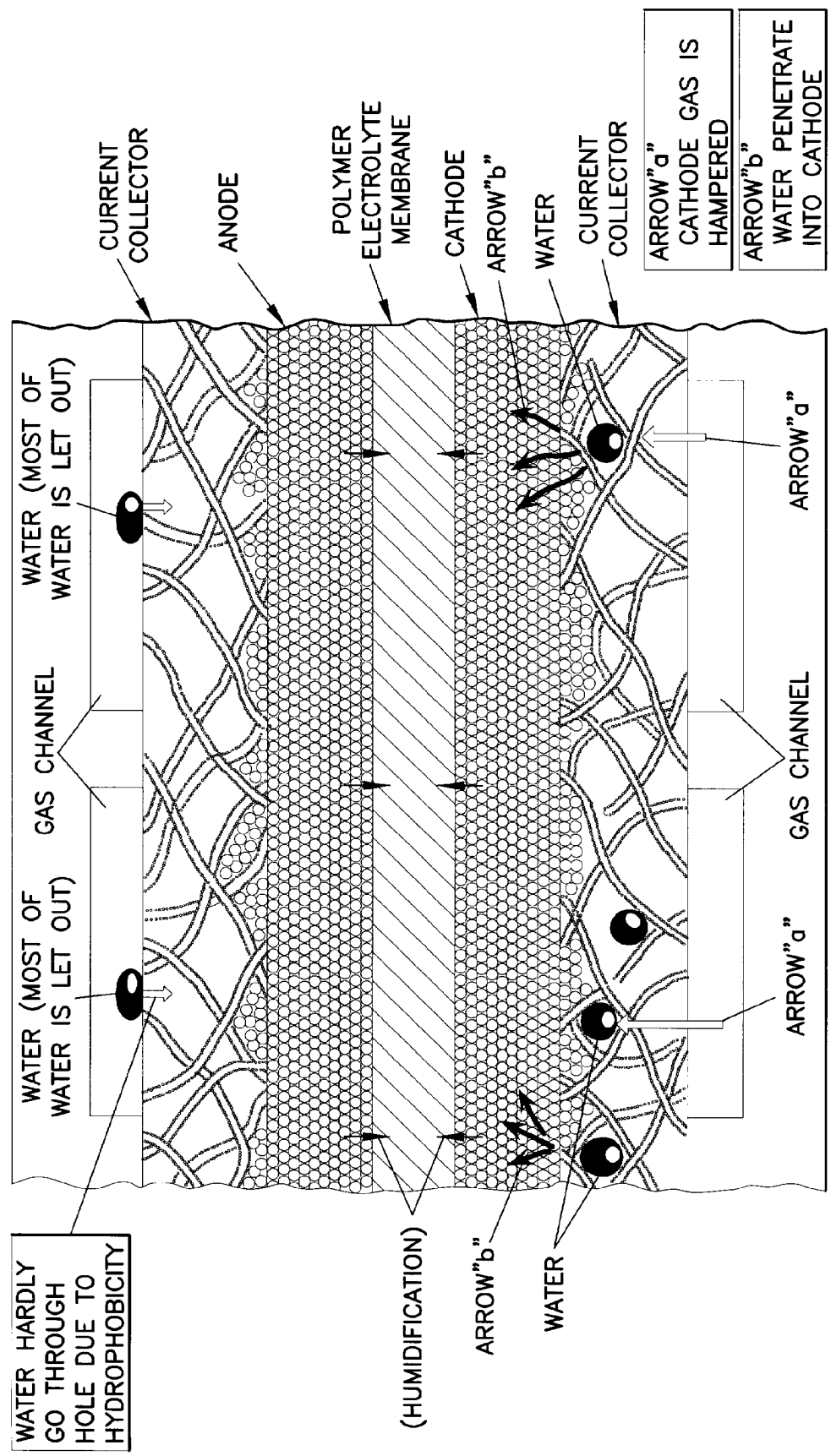
FIG. 3 is a sectional view of a conventional current collector.

FIG. 3 is a sectional view of a main part of a fuel cell using a conventional current collectors of hydrophobic finish carbon paper and shows the move of water near the current collectors.

Conventionally, in a cathode-side current collector, reaction product water tends to stay in holes formed by skeleton fibers of a porous substrate (see FIG. 3). If reaction product water stays in holes of the current collector, the flow of cathode gas is hampered (the arrow "a") and the cathode gas is not sufficiently distributed to the cathode. As the amount of sweat increases, gas flow paths to the cathode is blocked in a wide area in the current collector, which reduces voltage over time.

Even if this conventional current collector is used, when a resin such as NAFLON® which is hydrophilic is used as a binder for the cathode, a part of staying reaction product water penetrates as indicated by the arrow "b" due to the hydrophilic property of the binder. Therefore, paths of cathode gas to electrodes can be maintained to some extent.

However, there is a limitation in maintaining gas flow paths by removing sweat by letting the sweat penetrate into the cathode. More specifically, as can be seen from the following experimental results, the current collector is mainly hydrophobic so that the current collector has bad water permeability and most of reaction product water stays in holes in the current collector.

The following is a description of the current collector 41 of a synthetic porous substance.

Reaction product water mainly clumps on the surface area of the hydrophilic phase 41d. The water goes through the hydrophilic phase 41d from the surface area of the hydrophilic phase 41d to the cathode gas channel 31 as indicated by the arrow "c" and is let out into the cathode gas channel 31 (see FIG. 2). The moving water mechanism is the capillary phenomenon of the path F1' formed by the successive first bulking agent R1, for instance. Another moving water mechanism is that the water moves to the cathode gas channel 31 by successive repetition of absorption and desorption of water on the surface of the first bulking agent R1 (that is, according to balance between surface tension of water and that of the first bulking agent R1). Still, when a porous material is used as the first bulking agent R1, the water penetrates into holes of particles of the porous material and goes through the holes. Among these water, moving mechanism, the capillary phenomenon of the path F1' may be the most effective.

As described above, reaction product water generated in the cathode moves to the cathode gas channel 31 so that cathode gas are not hampered by reaction product water staying in holes in the current collector and is supplied to the cathode. As a result, voltage does not decrease over time.

The current collector 40 includes the following functions which a conventional current collector does not have.

A conventional current collector used for an anode is mainly hydrophobic so that the conventional current collector has a bad water permeability, as described above. Therefore, when sweat of condensed steam adheres to the surface of the current collector exposed to the anode gas channel, most of the sweat is let out with non-reaction gas through manifolds for letting out anode gas. In this case, the polymer electrolyte membrane is not effectively humidified and, in some cases, the layer dries. As a result, the ion conductivity of the polymer electrolyte membrane decreases, which reduces the electrochemical reactivity.

When a conventional current collector is used for an anode and a binder used for the anode or a cathode is a hydrophilic resin such as NAFLON®, water is maintained due to the hydrophilic property.

However, this current collector used for the anode has low water permeability so that water is hardly supplied to the polymer electrolyte membrane through the current collector. While this does not so matter when the operation temperature of a fuel cell is relatively low because a hydrophilic resin forming the anode maintains moisture, this matters greatly when the temperature is relatively high. That is, even if the hydrophilic property of electrodes contacting the polymer electrolyte membrane is increased so that a situation where the polymer electrolyte membrane is easily humidified is obtained, water is hardly to be supplied through the anode-side current collector. As a result, the effect of increased hydrophilic property of electrodes cannot be fully achieved. This problem becomes prominent in particular when the fuel cell operates at high temperature at which water tends to evaporate.

Conversely, the current collector 40 has a function for maintaining water.

Water of condensed supersaturating steam in anode gas clumps mainly around the hydrophilic phase 40d on the surface of the current collector 40 exposed to the anode gas channel 21. This clumping water goes through the current collector to the anode as indicated by the arrow "d" in FIG. 2 due to the capillary phenomenon of the path F1 or due to the repetition of absorption and desorption to the surface of the hydrophilic bulking agent. As a result, the clumping water is supplied to and humidifies the polymer electrolyte membrane.

The supplied water having been moved to the anode penetrates into the anode through a hydrophilic phase of resin such as NAFLON® forming the anode and is used to humidify the polymer electrolyte membrane directly or indirectly. In a indirectly case, water penetrating into the hydrophilic resin phases in the anode is evaporated at an operation temperature and indirectly humidifies the polymer electrolyte membrane. In a direct case, water penetrating into the hydrophilic resin phases in the anode goes through the phases and humidifies the polymer electrolyte membrane directly.

As described above, the current collectors 40 and 41 are loaded with bulking agents and form density porous substances and, furthermore, electrodes and the current collectors surrounding the polymer electrolyte membrane has high hydrophilic property so that a wide area in the fuel cell 1 has high hydrophilic property and the fuel cell 1 achieves a high humidification effect.

A function for allowing water to go through a current collector freely is defined as a "water moving function" in this application. The defined function includes a function for allowing reaction product water to go through the current collector to the cathode gas channel 31 and a function for allowing condensation product water to go through the current collector to an anode.

Note that the current collectors 40 and 41 undoubtedly has enough gas permeability.

Gas (reaction gas such as anode gas or cathode gas, or steam) is mainly distributed through the path F2 (F2') maintained in the hydrophobic phase 40c (41c). Because water almost exclusively goes through the hydrophilic phase 40d (41d) as described above, gas is certainly distributed to an electrode through the path F2 (F2') maintained in the hydrophobic phase 40c (41c) as indicated by the arrow "e". However, when water does not go through the path F1 (F1') in the hydrophilic phase 40d (41d), the hydrophilic phase 40d (41d) is used to distribute gas.

The water moving function described above is affected by a mixture ratio of the fist bulking agent R1 and the second bulking agent R2 in the porous mixture phase 40b (41b). More specifically, when the amount of the second bulking agent R2 which is hydrophobic is too large, the number of paths F1 (F1') decreased and water does not move sufficiently; when the amount of the first bulking agent R1 which is hydrophilic is too large, enough paths F2 (F'2) which are the paths for distributing gas are not maintained. Accordingly, for instance, when an average hole diameter of the porous mixture phase 40b (41b) is in a range from 0.01 $\mu$m to 5 $\mu$m, it is preferable to set the mixture rate of hydrophobic fluororesin in the phase to a range from 5 wt % to 60 wt %.

Because a conventional current collector which is not loaded with bulking agents includes some parts in which narrow gaps between fibers form capillary paths, reaction product water may go through the capillary paths. However, the rate that the capillary paths are formed is low so that the water moving function is hardly achieved. On the contrary, when bulking agents is loaded into holes of a porous substrate as this embodiment, capillary paths are formed at high rate, achieving a profound water moving function.

When a conventional current collector which is a hydrophobic finish carbon paper is used, carbon fibers constructing the carbon paper go through the carbon paper perpendicular to the carbon paper and, therefore, water moves using the carbon fibers as paths. However, in this case, only little amount of water moves along the carbon fibers so that the water moving function is hardly expected.

<Embodiment Modifications>

While, in the above description, the anode-side current collector 40 includes a function for supplying water and the cathode-side current collector 41 includes a function for letting out water, these current collectors are formed in the same manner so that the current collector 40 also includes the function for letting out water and the current collector 41 also includes the function for supplying water.

When anode gas is not humidified and cathode gas is humidified during the operation of a fuel cell, the water moving function is achieved by using the synthetic porous substance only for a cathode-side current collector. When anode gas is humidified during the operation as described in the present embodiment, it is desirable that the cathode-side current collector as well as the anode-side current collector is made of the synthetic porous substances so that the distribution of gas is not hampered due to staying reaction product water, thereby achieving a stable operation.

While the current collectors 40 and 41 and the cell are formed to have a single-piece construction, the current collectors may be separate from anode or cathode which is formed on a carbon paper having been subjected to a hydrophobic finishing.

If only one of the pair of current collectors 40 and 41 includes the hydrophilic areas and the gas flow paths, the current collector contacts the cathode layer, thereby allowing the reaction product water to pass through the hydrophilic areas and into the channels of the second channel member. The anode layer and cathode layer can include a catalyst and a hydrophilic material. The hydrophilic material can bind the catalyst particles. Optionally, a component material of either the anode layer or the cathode layer can be used as the hydrophilic material that is loaded into a plurality of through openings.

While, in the above description, the successive particles of the hydrophilic first bulking agent R1 pass through the porous substrate between both surfaces of the porous substrate, the particles does not exist successively in some parts of the porous substrate. In these parts, when the distance between the particles is around the diameter of a drop particles, the water moving function is achieved by the surface tension.

Experiment 1

Figure 11:
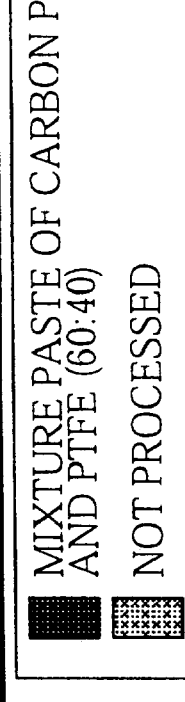
FIG. 11 (Table 2) gives processing methods and resultant processed surfaces. carbon.

Cathode-side current collectors "A" and "B" of carbon paper processed as shown in Table 2 (FIG. 11) based on this embodiment and cathode-side current collector "C" for comparison are produced. Fuel cells for experiment (experiment fuel cells) including the current collectors "A" and "B" having the above structure and a fuel cell for comparison (a comparison fuel cell) including the current collector "C" are produced.

Members, except for the cathode-side current collector, constructing each fuel cell are produced under the conditions below.

Electrodes (an anode and a cathode) are made of platinum carbon (Pt/C), NAFLON®, and PTFE (weight ratio is 67.9:2.1:30) using a known sheet forming method.

A polymer electrolyte membrane is made of NAFLON®. The polymer electrolyte membrane and the electrodes are crimped using the hot press method (temperature is 150° C., 70 kg/cm$^2$, process time is 90 seconds), with the layer and electrodes contacting each other, to produce a cell.

An anode-side current collector is produced by impregnating carbon paper with 16 wt % FEP and by subjecting the carbon paper to a heat treatment at 380° C. for one hour.

The experiment fuel cells and the comparison fuel cell which are produced in the manner described above operate under the conditions below under which reaction product water due to electrode reaction tends to stay. By doing so, change in cell characteristics over operation time is evaluated.

Figure 4A:
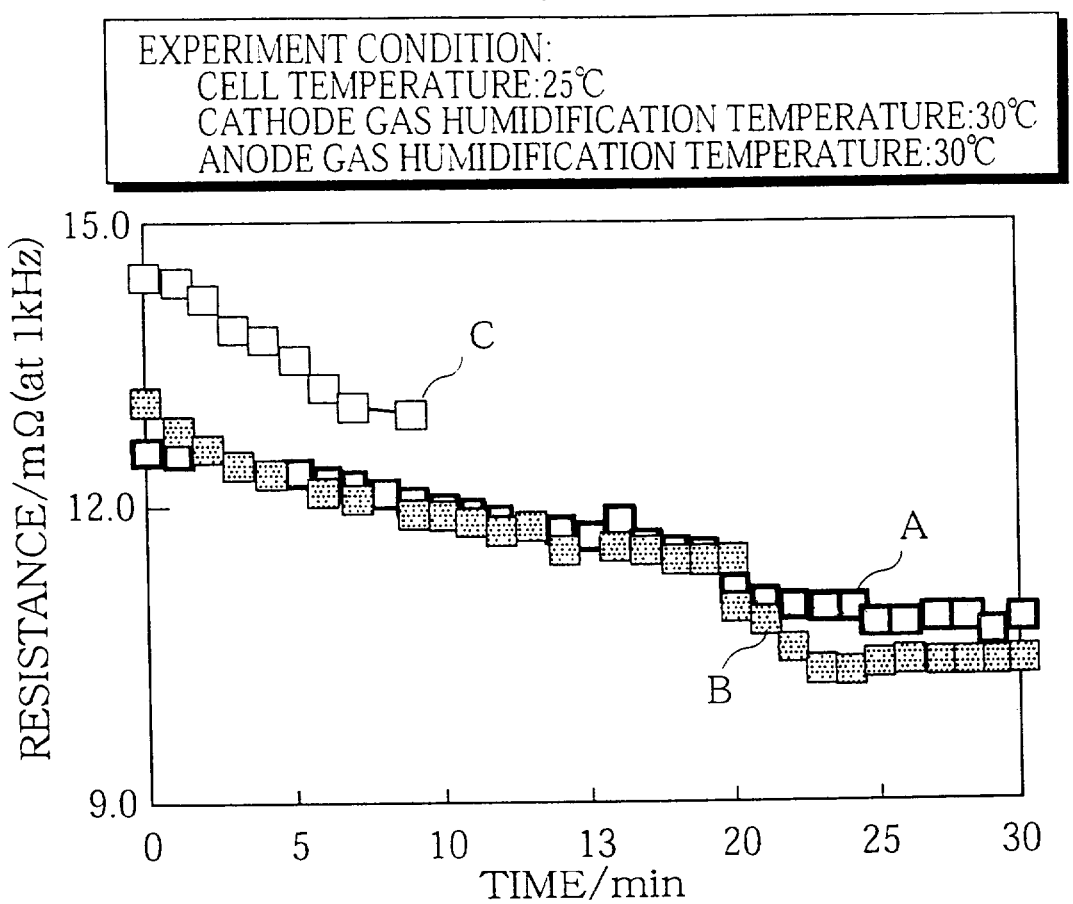
FIGS. 4a and 4b shows characteristics of the result of Experiment 1.
Figure 4B:
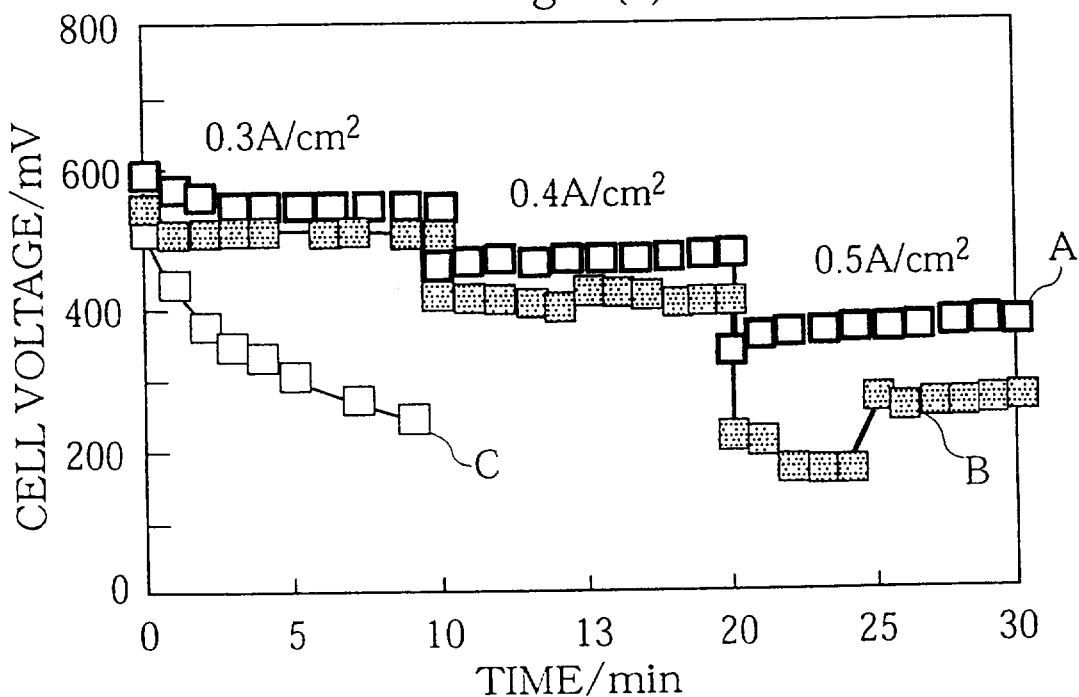

(Operating Conditions)
cell temperature: 25° C.
cathode gas humidification temperature: 30° C.
anode gas humidification temperature: 30° C.
current density: 0–10 min; 0.3 A/cm$^2$
10–20 min; 0.4 A/cm$^2$
20–30 min; 0.5 A/cm$^2$ FIGS. 4a and 4b shows the experiment results. FIG. 4(a) is a characteristic figure of plots of resistance (vertical axis, unit:mΩ) versus operation time (horizontal axis, unit:min). FIG. 4(b) is a characteristic figure of plots of unit cell voltage (vertical axis, unit:mV) versus operation time. Note that the resistance is measured using the 1 KHz AC impedance method to remove resistance of electrode reaction and to measure internal resistance reflecting humidification condition of constructing members and in particular of a polymer electrolyte membrane.

As can be seen from FIG. 4(a), resistance of the fuel cells including the current collectors "A" and "B" is smaller than that of the comparison fuel cell including the current collector "C". This implies that the experiment fuel cells including current collectors of dense structures achieves higher effect for humidifying the polymer electrolyte membrane than the comparison fuel cell including a current collector of a sparse structure. That is, the experiment fuel cells are superior to the comparison fuel cell in water supplying operation for the polymer electrolyte membrane.

As shown in FIG. 4(b), the cell voltage of the comparison fuel cell tends to decrease dramatically from operation initial time and decreases to about 50%. On the contrary, the cell voltage of the experiment fuel cells including the current collectors "A" and "B" remains high, compared with that of the comparison fuel cell including the current collector "C", and is stable over time. It is apparent from this result that the experiment fuel cells achieve superior stability even if the fuel cells operate at low operating temperature and at room temperature at which water due to condensation hardly evaporates.

After the experiment, each fuel cell is disassembled to observe holes near an interface between a cathode-side current collector and a cathode. The observation reveals that a large amount of water stays in holes of the comparison fuel cell, while the amount of water staying in holes of the experiment fuel cells is remarkably small, compared with the comparison fuel cell.

Judging from the observation and experiment results, reaction product water staying in a cathode-side current collector deteriorates cell characteristics.

Judging from the experiment result that the cell voltage of the fuel cell including the current collector "A" is higher than that of the fuel cell including the current collector "B", it can be said that applying mixture paste to both sides of a porous substrate of carbon paper makes the water moving function better.

Experiment 2

The following is a description of change in cell characteristics due to various cathode gas humidification temperatures, 63° C., 73° C., 78° C., and 80° C. under the following operating conditions.

(Operating Conditions)
cell temperature: 80° C.
current density: 0.5 A/cm$^2$
utilization factor of hydrogen gas: 50%
utilization factor of oxygen: 20%

Electrodes of fuel cells used for this experiment are made of paste whose composition is (Pt/C) NAFLON® (weight ratio=100/15) using the screen printing method, unlike the current collectors "A" and "B". NAFLON® solution of 0.5 g/cm$^2$ is sprayed on surfaces of the electrodes to produce Nafion layers. The electrodes with the NAFLON® layers are subjected to the hot pressing to form a cell structure element. The structures, except for the electrodes, of the fuel cells are the same as those of Experiment 1.

Figure 5:
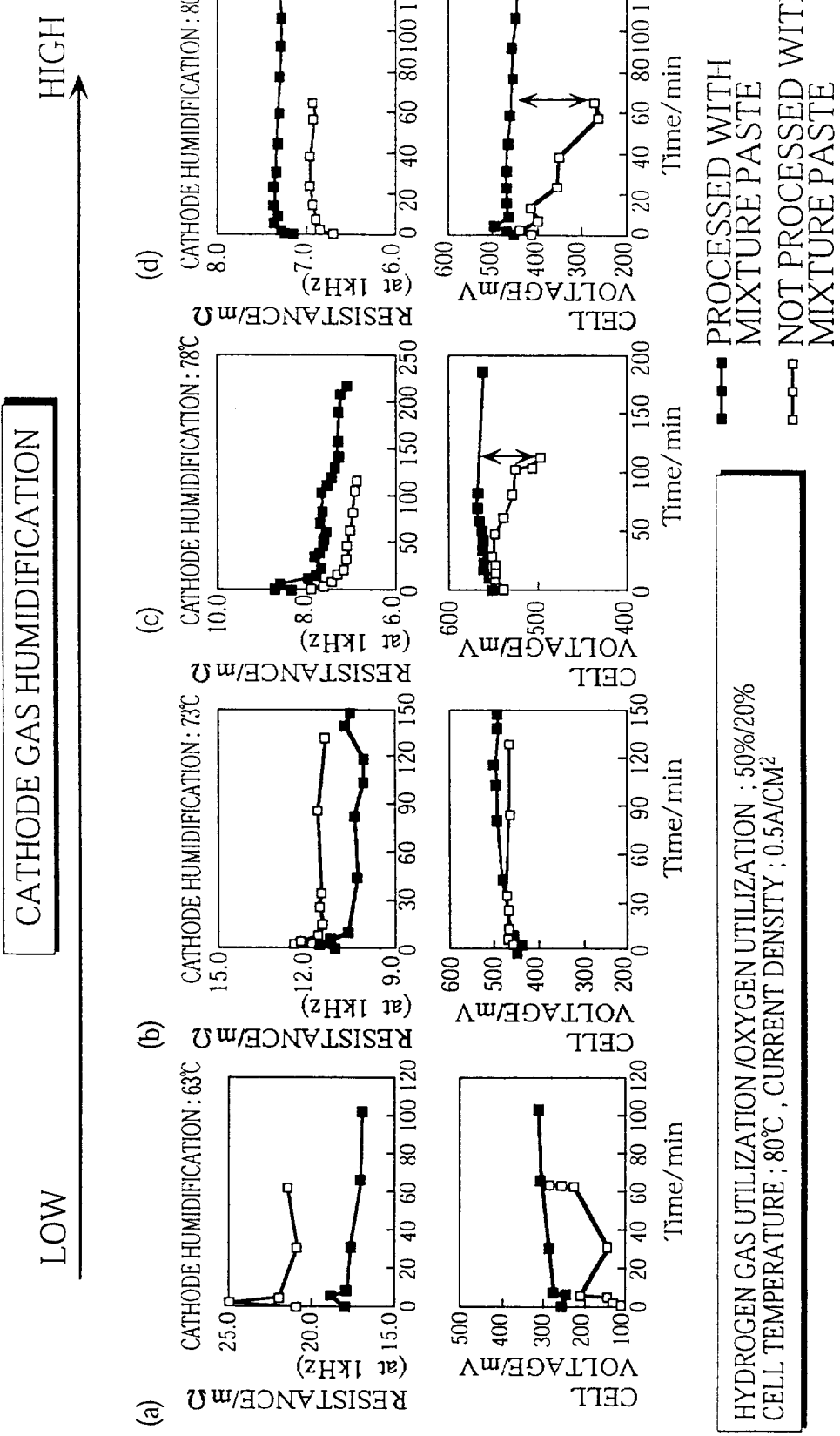
FIG. 5 shows characteristics of the result of Experiment 2.

FIG. 5 shows experiment results. As shown in FIG. 5, in the case of the experiment fuel cell including the current collector "A" of carbon paper which is processed by applying the first and second bulking agents R1 and R2, cell voltage is high, compared with the case of the comparison fuel cell including a non-processed current collector. Furthermore, the cell voltage remains high over time.

There is a remarkable difference between the experiment fuel cells and the comparison fuel cell when the humidification temperature is high and closer to the operating temperature. Supersaturating steam condenses when the humidification temperature is high and closer to the operating temperature. This condensation product water is removed from the experiment fuel cell including the current collector "A" through holes in the current collector, whereas the condensation product water stays in the comparison fuel cell including the current collector "C", and enough cathode gas is not supplied.

Embodiment 2

The fuel cell of this embodiment has the same structure as Embodiment 1, except for anode-side current collector 200 and cathode-side current collector 210. Therefore, the following description mainly concerns different aspects.

<Structure of Current Collector>

The current collector 200 (210) is produced by applying hydrophobic resin and hydrophilic resin to a porous substrate, whose skeletons are electric conductive fibers, such as carbon paper.

FIG. 6(a) shows a sectional view of a main part of a cell structure element including the current collectors 200 and 210. FIG. 6(b) is a fragmentary view of the current collector 200 or 210.

As shown in FIG. 6(a), the current collector 200 (210) includes: the hydrophobic layers 202 (212) which are formed to surround fibers 201 (211); and hydrophilic layers 203 (213) made of a hydrophilic material on the hydrophobic layers 202 (212), where particles of the hydrophilic material successively exist through the porous substrate to connects both surfaces of the porous substrate.

As shown in FIG. 6(b), the areas provided with the hydrophilic layers 203 (213) are strip-like, are parallel to each other, and are positioned almost along the centers of gas channels 21 (31). The areas are properly dispersed in the entire porous substrate.

The fibers 201 (211) are electric conductive and are carbon fibers or metal fibers, as Embodiment 1.

The hydrophobic layers 202 (212) are made of the same hydrophobic resin as that used for the current collector 40 (41). As the current collector 40 (41), the hydrophilic resin is a resin, such as perfluorocarbon sulfonic acid polymer or perfluorocarbon carboxylic acid polymer, nylon, rayon, polychlal, acrylic, polychlal, and vinylidene chloride polymer.

Manufacturing Method of Current Collector

The above current collector 200 (210) is produced in the manner below.

By impregnating a porous substrate with hydrophobic resin or by spraying hydrophobic resin on the porous substrate, the hydrophobic resin adheres to the substrate. The porous substrate, to which the resin adheres in the above manner, is heated at high temperature (360° C., for instance). By spraying hydrophilic resin on slits which are established in a stripe shape with keeping a certain interval between the slits, for instance, the hydrophilic resin adheres on the hydrophobic resin. In this manner, the current collector of this embodiment, namely the porous substrate to which the hydrophobic and hydrophilic resins adhere, is produced.

Note that it is preferable to perform the process of hydrophilic resin on both surfaces, not on only one surface, of the porous substrate. This is because, when the process is performed on both surfaces, hydrophilic layers which pass through the substrate to connect both surfaces of the substrate, are obtained at a high rate, that is, each area of an going across hydrophilic layer per unit area is large.

It is preferable to set the composition ratio of hydrophobic fluororesin and of hydrophilic resin to the porous substrate in a range from 5 wt % to 60 wt % and in a range from 3 wt % to 30 wt %, respectively.

Water Moving Function

As indicated by the "f" in FIG. 6(a), most of reaction product water penetrates into the hydrophilic layers 213 and goes through the current collector 210 to the cathode gas channel 31. As a result, drops of the reaction product water does not block holes in the current collector 210, preventing the drops from hampering the distribution of cathode gas.

As indicated by the arrow "g", condensation product water of supersaturating steam in anode gas penetrates mainly into the hydrophilic layers 203, goes through the current collector in the direction to the cathode, and is supplied to the polymer electrolyte membrane to humidify the polymer electrolyte membrane.

Reaction gas is distributed through spaces surrounded by the hydrophobic layers 202 (212) to the electrode.

Embodiment Modifications

In this embodiment, at first, the hydrophobic layers are formed and then the hydrophilic layers are formed on the hydrophobic layers. However, conversely, the hydrophilic layers are formed by letting hydrophilic resin to adhere to a porous substrate and then the hydrophobic layers are formed by letting hydrophobic resin to adhere partially to the hydrophilic layers.

The area provided with the hydrophilic layers does not need to be formed in stripe shapes and may be distributed in dot shapes.

Embodiment 3

The fuel cell in this embodiment has the same structure as that in Embodiment 1, except for the structures of anode-side current collector 300 and cathode-side current collector 310. Therefore, the following description mainly concerns different aspects.

Structure of Current Collector

FIG. 7 is a sectional view of a main part of the cell structure element including the current collectors 300 and 310.

As shown in FIG. 7, the current collector 300 (310) is formed by loading the first and second bulking agents R1 and R2 into holes in a porous substrate, as the current collector 40 (41). However, the current collector 300 (310) includes paths T1 (T1') of a predetermined inside diameter. The paths T1 (T1') are formed by performing the following process on the porous substrate.

One end of each paths T1 (T1') is exposed to the anode gas channel 21 (the cathode gas channel 31) and the other end is exposed to the cathode 12 (the cathode 13) so that the paths T1 (t1') go across the current collector 300 (310). The hydrophilic third bulking agent R3 is loaded into the paths T1 (T1').

The third bulking agent R3 may be the same material as the hydrophilic first bulking agent R1.

The paths T1 (T1') are formed by loading the third bulking agent R3 so that path spaces F3 (F3') formed by gaps between particles of the bulking agent R3 are maintained in the paths T1 (T1'). The path spaces F3 (F3') pass through the porous substrate between both surfaces of the porous substrate and water moves mainly through the path spaces F3 (F3') due to capillary phenomenon.

Manufacturing Method of Current Collector

The following is a description of the current collector 300 (310) including the paths T1 (T1') described above.

An original substrate of the current collector 300 (310) is the same synthetic porous substance as the current collector 40 (41) in Embodiment 1.

Figure 8:
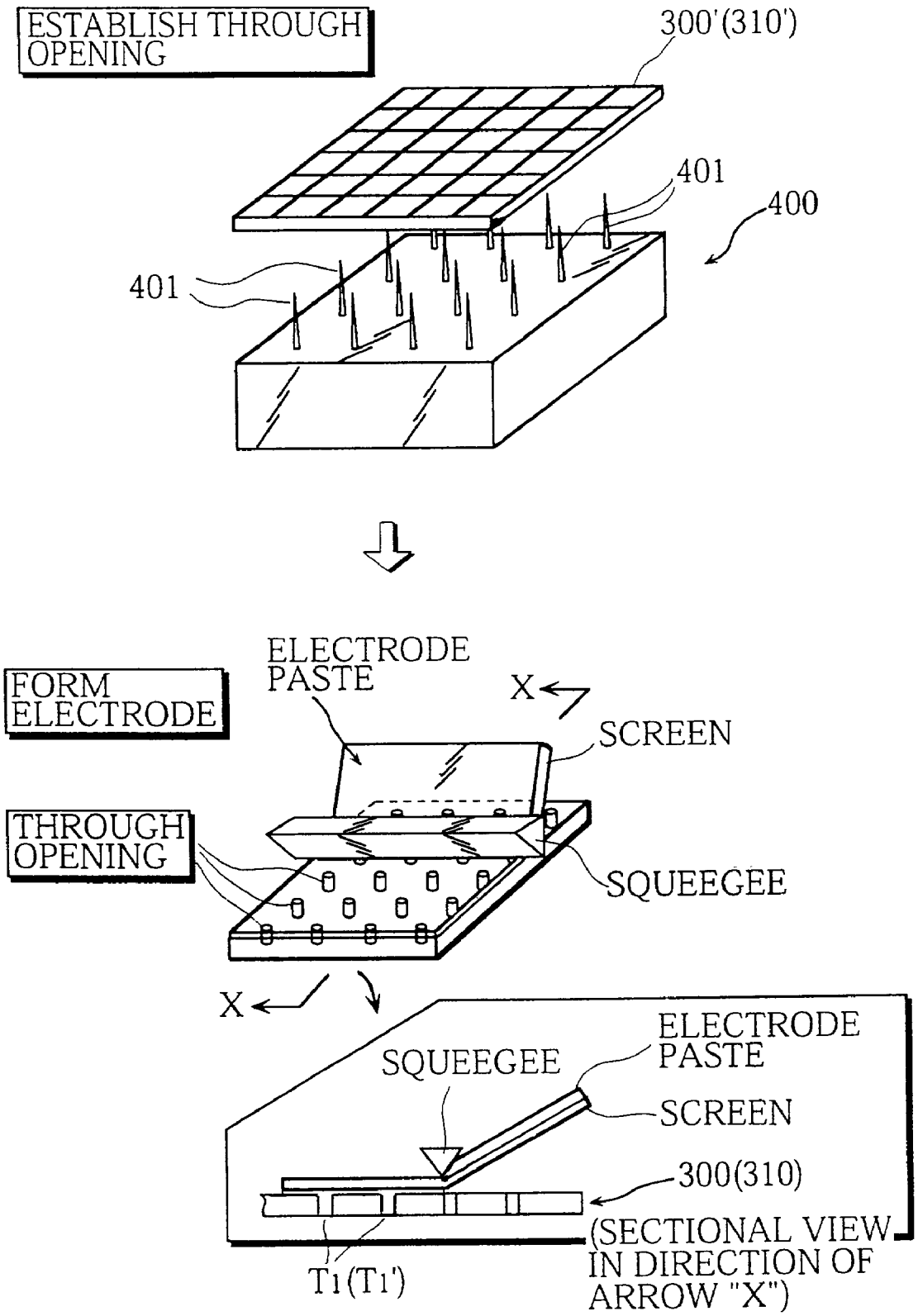
FIG. 8 shows a method of producing the current collector of Embodiment 3.

FIG. 8 shows a method of producing the paths T1 (T1').

As shown in this figure, a plurality of through openings of a predetermined diameter are established using opening establishing device 400, with the plurality of through openings being dispersed in entire synthetic porous substance 300 (300').

The opening establishing device 400 includes a plurality of needles 401 of a predetermined diameter and needle support plate 402 (not shown), where the plurality of needles 401 being supported by the needle support plate 402. Through openings whose diameter is equal to the diameter of the needles 401 is established in the original substrate 300 (300') by: making the tips of the needles 401 and the original substrate 300 (300') contact each other; and applying proper pressure to needles 401 and the original substrate 300 (300').

It is preferable to set the diameter of the through openings to a range from $0.001$ cm$^2$ to $0.04$ cm$^2$.

This is because when the diameter is too small and the cross section of each through opening is smaller than this range, the paths T1 (T1') do not achieve enough effect; when the diameter is too large and the cross section of each through opening is larger than this range, the number of water paths increases too many and, conversely, the number of gas flow paths decreases.

Note that these through openings are established so that one end of each through opening is exposed to a gas channel 21 (31) when each member is laminated.

First Manufacturing Method

Electrodes are established by applying electrode forming paste to the original substrate in which the through openings have been established, the electrode forming paste including a hydrophilic binder, such as perfluorocarbon sulfonic acid polymer and perfluorocarbon carboxylic acid polymer, catalyzer, and volatile solvent (mixture of platinum carbon, NAFLON®, and volatile solvent (Pt/C:NAFLON®=100:20 (weight ratio), for instance) using the screen printing method. When electrodes are established in this manner, the paste enters into the through openings which are established beforehand so that the current collector 300 (310) including the paths T1 (T1') is simultaneously produces. The paths T1 (T1') is hydrophilic material (substance having the same composition as the nonvolatile component used for forming electrode in this case) which is loaded into the through openings. With this method, the paths T1 (T1') and electrodes are formed simultaneously.

Second Manufacturing Method

Another manufacturing method is to establish through openings and to load hydrophilic bulking agent, simultaneously. With this method, hydrophilic resin volatile solution adheres to the needles 401 of the opening establishing device 400 beforehand, through openings are established in an original substrate with the needles 401, and the substrate is dried.

Water Moving Function

The current collectors of Embodiment 1 are produced using mixture past of hydrophobic material and hydrophilic material. Therefore, in some cases, particles of the hydrophobic material may exist between particles of the hydrophilic material, with sequence of the particles of the hydrophilic material being cut in the current collectors. Also, the mixture paste is applied onto a porous substrate which is formed by complicated fibers so that sequence of particles of hydrophilic material is cut by the fibers.

Accordingly, although total hydrophilic property of current collectors are improved and, therefore, water moving function is achieved, some parts of the current collectors does not utilize the hydrophilic property of the hydrophilic material. More specifically, although it is preferable that walls of the paths F1 (F1'), through which water moves, is successive particles of a hydrophilic material, particles of a hydrophobic material are mixed in the particles of the hydrophilic material and cut the sequence of the particles of the hydrophilic material in some parts of the walls. In this case, the capillary phenomenon of the paths F1 (F1'), which pass through the current collector between both surfaces of the current collector, sometimes does not occur and thus water does not move.

On the contrary, particle sequence of a hydrophilic material is not cut by particles of an extremely high hydrophobic material such as fluororesin in the current collectors 300 and 310. Furthermore, the current collectors 300 and 310 include the paths T1 (T1') which are through openings established vertical to the current collectors and are loaded with a high hydrophilic material. AS a result, the paths T1 (T1') have higher hydrophilic property than the hydrophilic phases 40$d$ (41$d$) in the same space volume.

Therefore, the current collectors 300 and 310 have profound water moving function, compared with the current collectors 40 and 41, due to the paths T1 (T1').

Note that although the through openings are loaded with materials composing electrodes, most of catalyzer particles of the material are carbon and have hydrophilic property.

Embodiment Modifications

When through openings are established in current collectors of Embodiment 2 in the same manner as Embodiment 3 and a hydrophilic bulking agent is loaded into the through openings, the current collectors have a more effective water moving function.

Even if a current collector has only water flow paths produced by establishing through openings in a porous substrate and by loading a hydrophilic material into the through openings, the current collector has a more effective water moving function than a conventional current collector.

Experiment 3

The experimental fuel cell "D" is produced using current collectors including the paths T1 (T1') formed in the first manufacturing method described above (ratio of paste for forming electrodes to nonvolatile component, Pt/C:Nafion= 100:20 (weight ratio)). The experiment fuel cell "E" is produced using current collectors including the paths T1 (T1') formed in the second manufacturing method (through openings are established with needles to whose tips NAFLON® alcohol solution adheres).

The comparison fuel cell "F" is produced using current collectors formed in the same manner as Embodiment 1. The comparison fuel cell "G" is produced using conventional current collectors which are carbon paper subjected to a hydrophobic finishing.

These fuel cells "D" to "G" operate under the following operating conditions to measure cell voltage over time.

Figure 9:
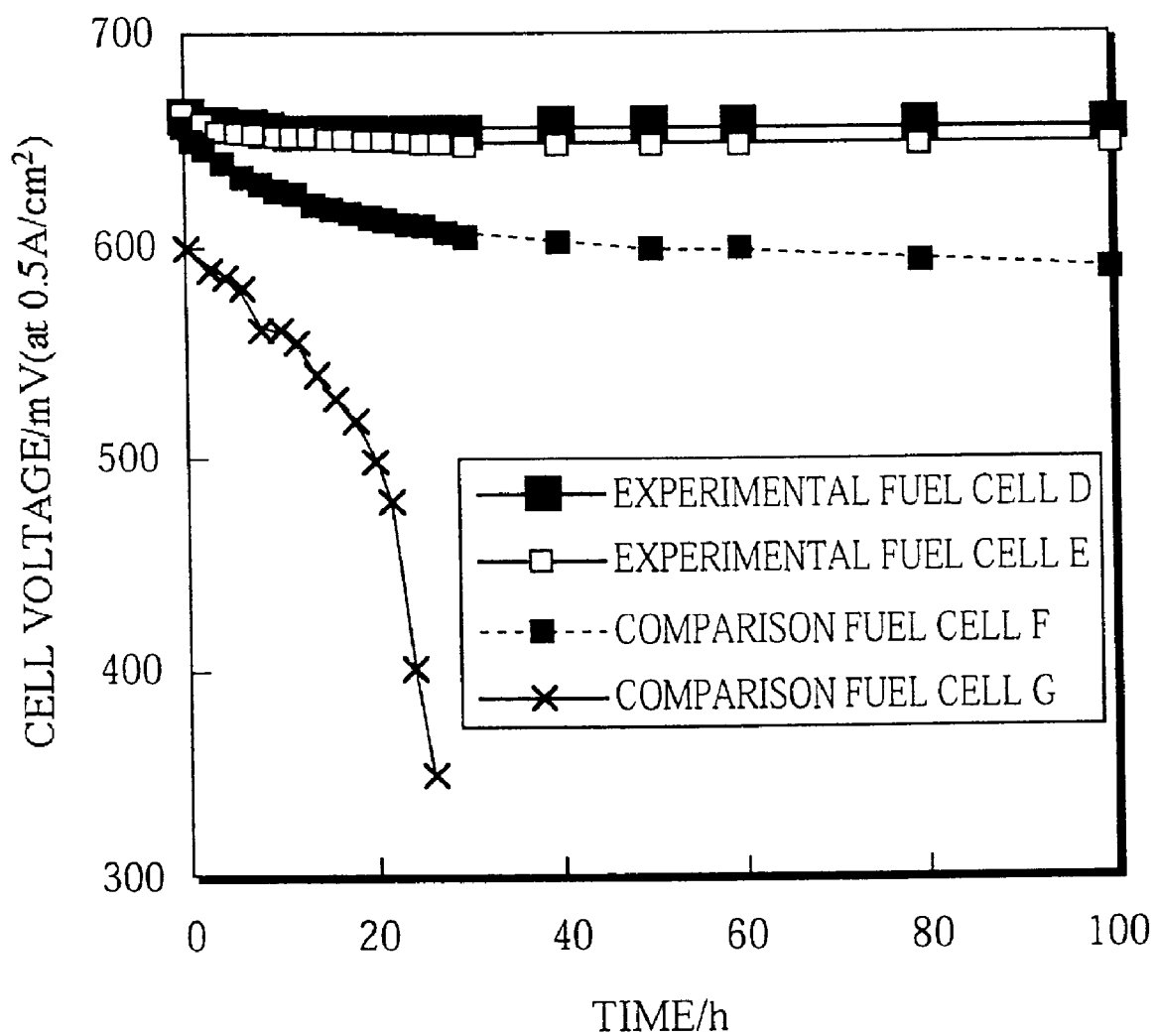
FIG. 9 shows characteristics of the result of Experiment 3.

Operating conditions cell temperature: 80° C.

current density: 0.6 A/cm$^2$ utilization factor of hydrogen gas: 50% utilization factor of oxygen: 20% anode gas humidification condition: moisture is added to anode gas at the ratio of about 1 ml/min FIG. 9 shows plots of the result of this cell voltage measurement versus time.

As can be seen from this figure, cell voltage of the experiment fuel cells "D" and "E" remain stable over time, whereas cell voltage of the comparison fuel cell "G" remarkably decreases. Cell voltage of the comparison fuel cell "F" does not decrease to the same degree as the comparison fuel cell "G", but the stability of the cell voltage of the comparison fuel cell "G" is not so excellent as the experiment fuel cells "D" and "E".

It is apparent from the result that water moving function achieved by the paths T1 and T1', in which only hydrophobic material described above is loaded, effectively maintains stable cell characteristics.

Conclusion of Effect

As described above, the current collector of the present invention includes hydrophilic material other than skeleton fibers of the current collectors so that total affinity with water, namely hydrophilic property, of the current collector is higher than that of conventional one, making condensation product water and reaction product water move freely in the current collector.

Because reaction product water generated in a cathode tends to stay on an interface between the cathode and a current collector and this staying water deteriorates cell characteristics, the current collector of the present invention applied to a cathode side produces a profound effect. That is, when the current collector of the present invention is used, reaction gas is not hampered by reaction product water and is supplied to each electrode. As a result, cell characteristics such as cell voltage does not decrease and stable power generation is achieved.

When the current collector of the present invention is used for an electrode from which humidified gas is supplied to a polymer electrolyte fuel cell, the current collector produces an effect that water for humidifying a polymer electrolyte membrane is effectively supplied.

It should be noted here that even if a current collector is produced by coating a porous substrate such as carbon paper only with a neutral polarity material, instead of conventional hydrophobic material such as PTFE, this current collector has high hydrophilic property in total.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being therein.

What is claimed is:

1. A fuel cell comprising:

a cell including an electrolyte member, an anode layer, and a cathode layer, wherein one main surface of the electrolyte member is provided with the anode layer and the other main surface of the electrolyte member is provided with the cathode layer;

a pair of current collectors, where one of the pair of current collectors is positioned to contact the anode layer and the other of the pair of current collectors is positioned to contact the cathode layer, at least one current collector includes a thin porous substrate comprising a fibrous material and a hydrophilic material, wherein the hydrophilic material is either (i) loaded between fibers of the thin porous substrate or (ii) provided to cover surfaces of the fibers so that hydrophilic areas formed by the hydrophilic material successively pass through the thin porous substrate between both surfaces of the thin porous substrate;

a first channel member which includes channels, the channels facing the anode layer with one of the pair of current collectors in between; and a second channel member which includes channels, the channels facing the cathode layer with the other one of the pair of current collectors in between, wherein the hydrophilic areas of the at least one current collector are exposed to channels of at least one of the first channel member and the second channel member.

2. The fuel cell defined in claim 1, wherein the hydrophilic areas include at least one path which is surrounded by particles of the hydrophilic material.

3. The fuel defined in claim 2, wherein the at least one current collector each includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

4. The fuel cell defined in claim 3, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

5. The fuel cell defined in claim 1, wherein at least one current collector each includes at least one gas flow path which passes through the thin porous substrate between both surfaces of the thin porous substrate, wherein the gas flow is surrounded by particles of a hydrophobic material that is either (i) loaded between fibers of the thin porous substrate or (ii) provided to cover surfaces of the fibers.

6. The fuel cell defined in claim 5, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

7. The fuel cell defined in claim 1, wherein a plurality of through openings are established in the at least one current collector, wherein the plurality of through openings pass through the thin porous substrate between both surfaces of the thin porous substrate, wherein a hydrophilic material is loaded into the plurality of through openings.

8. The fuel cell defined in claim 7, wherein the at least one current collector each includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

9. The fuel cell defined in claim 8, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

10. A cell structure element, which is a structural unit of a power generation element of a fuel cell, comprising:

a cell including an electrolyte member, an anode layer, and a cathode layer, wherein one main surface of the electrolyte member is provided with the anode layer and the other main surface of the electrolyte member is provided with the cathode layer; and a pair of current collectors, wherein one of the pair of current collectors is positioned to contact the anode layer and the other of the pair of current collectors is positioned to contact the cathode layer, at least one current collector includes a thin porous substrate comprising a fibrous material and a hydrophilic material, wherein the hydrophilic material is either (i) loaded between fibers of the thin porous substrate or (ii) provided to cover surfaces of the fibers so that hydrophilic areas formed by the hydrophilic material successively pass through the thin porous substrate between both surfaces of the thin porous substrate.

11. The cell structure element defined in claim 10, wherein the hydrophilic areas include at least one path which is surrounded by particles of the hydrophilic material.

12. The cell structure element defined in claim 11, wherein the at least one current collector each includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

13. The cell structure element defined in claim 12, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

14. The cell structure element defined in claim 10, wherein the at least one current collector each includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

15. The cell structure element defined in claim 14, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

16. The cell structure element defined in claim 10, wherein a plurality of through openings are established in the at least one current collector, wherein the plurality of through openings pass through the thin porous substrate between both surfaces of the thin porous substrate, wherein a hydrophilic material is loaded into the plurality of through openings.

17. The cell structure element defined in claim 16, wherein the at least one current collector each includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

18. The cell structure element defined in claim 17, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

19. A current collector, which is used for a fuel cell, comprising:

a thin porous substrate comprising a fibrous material; and a hydrophilic material, wherein the hydrophilic material is either (i) loaded between fibers of the thin porous substrate or (ii) provided to cover surfaces of the fibers so that hydrophilic areas formed by the hydrophilic material successively pass through the thin porous substrate between both surfaces of the thin porous substrate.

20. The current collector defined in claim 19, wherein the hydrophilic areas include at least one path which is surrounded by particles of the hydrophlic material.

21. The current collector defined in claim 20 includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

22. The current collector defined in claim 21, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

23. The current collector defined in claim 19 includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

24. The current collector defined in claim 23, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroetylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, plychlal, and vinylidene chloride polymer.

25. The current collector defined in claim 19, wherein a plurality of through openings are established in the current collector, wherein the plurality of through openings pass through the thin porous substrate between both surfaces of the thin porous substrate, wherein a hydrophilic material is loaded into the plurality of through openings.

26. The current collector defined in claim 25 includes at least one gas flow path which passes through the thin porous substrate between both surfaces of the thin porous substrate, wherein the gas flow path is surrounded by particles of a hydrophobic material that is either (i) loaded between fibers of the thin porous substrate or (ii) provided to cover surfaces of the fibers.

27. The current collector defined in claim 26, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fiberts, polychlal, and vinylidene chloride polymer.

28. A polymer electrolyte fuel cell comprising:

a cell including an electrolyte member, an anode layer, and a cathode layer, wherein one main surface of the electrolyte member is provided with the anode layer and the other main surface of the electrolyte member is provided with the cathode layer;

a pair of current collectors, wherein one of the pair of current collectors is positioned to contact the anode layer and the other of the pair of current collectors is positioned to contact the cathode layer, and at least one current collector includes a thin porous substrate comprising a fibrous material, a hydrophilic material, and a hydrophilic material, wherein the hydrophilic material is either (i) loaded between fibers of the thin porous substrate or (ii) provided to cover surfaces of the fibers so that hydrophilic areas formed by the hydrophilic material successively pass through the thin porous substrate between both surfaces of the thin porous substrate, and the hydrophobic material is either (i) loaded between fibers of the thin porous substrate or (ii) provided to cover surfaces of the fibers so that at least one gas flow path surrounded by particles of the hydrophobic material passes through the thin porous substrate between both surfaces of the thin porous substrate;

a first channel member which includes channels, the channels facing the anode layer with one of the pair of current collectors in between; and a second channel member which includes channels, the channels facing the cathode layer with the other one of the pair of current collectors in between, wherein the hydrophilic areas of the at least one current collector are exposed to channels of at least one of the first channel member and the second channel member.

29. The polymer electrolyte fuel cell defined in claim 28, wherein when only one of the pair of current collectors includes the hydrophilic areas and the gas flow paths, the current collector contacts the cathode layer, wherein reaction product water generated by electrode reaction goes through the hydrophilic areas and is let out to the channels of the second channel member.

30. The polymer electrolyte fuel cell defined in claim 28, wherein when both of the pair of current collectors include the hydrophilic areas and the gas flow paths, the current collectors respectively contact the cathode layer and the anode layer, wherein reaction product water generated by electrode reaction goes through the hydrophilic areas of the current collector contacting the cathode layer and is let out to the channels of the second channel member, wherein when anode gas which is humidified beforehand is supplied to the anode layer during operation of the polymer electrolyte fuel cell, water supplied through the channels of the first channel member goes through the hydrophilic areas of the current collector contacting the anode layer and is used to humidify the polymer electrolyte membrane.

31. The polymer electrolyte fuel cell defined in claim 28, wherein the anode layer and the cathode layer are made of a catalyst and a hydrophilic material, the hydrophilic material binding particles of the catalyst.

32. The polymer electrolyte fuel cell defined in claim 28, wherein the hydrophilic areas include at least one path which is surrounded by particles of the hydrophilic material.

33. The polymer electrolyte fuel cell defined in claim 38, wherein a plurality of through openings are established in the at least one current collector, wherein the plurality of through openings pass through the thin porous substrate between both surfaces of the thin porous substrate, wherein a hydrophilic material is loaded into the plurality of through openings.

34. The polymer electrolyte fuel cell defined in claim 33, wherein the anode layer and the cathode layer are made of a catalyst and a hydrophilic material, the hydrophilic material binding particles of the catalyst.

35. The polymer electrolyte fuel cell defined in claim 34, wherein a component material of either of the anode layer or the cathode layer is used as the hydrophilic material loaded into the plurality of through openings.

36. The polymer electrolyte fuel cell defined in claim 35, wherein the porous substrate is made of a material selected from the group consisting of carbon fibers, metal fibers, and glass fibers;

the hydrophobic material is a fluororesin selected from the group consisting of polytetrafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ethylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

37. The polymer electrolyte fuel cell defined in claim 38, wherein the porous substrate is made of a material selected from the group consisting of carbon fibers, metal fibers, and glass fibers;

the hydrophobic material is a fluororesin selected from the group consisting of polyeterafluoroethylene, tetrafluoroethylene-perfluoroalkylvinylethercopolymer, tetrafluoroethylene-hexafluoropropylenecopolymer, polychlorotrifluoroethylene, polyvinylidene fluoride, polyvinyl fluoride, and tetrafluoroethylene-ehtylene copolymer; and the hydrophilic material is selected from the group consisting of carbon, metal, glass, ceramic, silica gel, zeolite, perfluorocarbon sulfonic acid polymer, perfluorocarbon carboxylic acid polymer, nylon, rayon, polyester, acrylic fibers, polychlal, and vinylidene chloride polymer.

* * * * *